US010287761B2

(12) United States Patent
Yuan et al.

(10) Patent No.: US 10,287,761 B2
(45) Date of Patent: May 14, 2019

(54) FAUCETS PROVIDING ADDITIONAL CONTROL FOR WATER FLOW

(71) Applicant: Globe Union Industrial Corp., Taichung (TW)

(72) Inventors: Chiahua Yuan, Taichung (TW); Yiping Lin, Taichung (TW); Huiling Chiu, Taichung (TW); Yuanhao Chang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 3 days.

(21) Appl. No.: 15/866,416

(22) Filed: Jan. 9, 2018

(65) Prior Publication Data

US 2018/0127960 A1 May 10, 2018

Related U.S. Application Data

(63) Continuation-in-part of application No. 15/189,087, filed on Jun. 22, 2016.

(51) Int. Cl.
*E03C 1/04* (2006.01)
*E03C 1/084* (2006.01)
(Continued)

(52) U.S. Cl.
CPC ............. *E03C 1/084* (2013.01); *E03C 1/04* (2013.01); *E03C 1/0404* (2013.01);
(Continued)

(58) Field of Classification Search
CPC ...... E03C 1/084; E03C 1/0404; E03C 1/0412; E03C 1/0401; E03C 2001/0415;
(Continued)

(56) References Cited

U.S. PATENT DOCUMENTS 3,580,503 A    5/1971  Ligon et al.
6,131,608 A    10/2000 Lu
(Continued)

FOREIGN PATENT DOCUMENTS

CN    205331574 U    6/2016
CN    205479654 U    8/2016
(Continued)

OTHER PUBLICATIONS

Extended European Search Report pursuant to Rule 62 EPC, The European Search Report (R. 61 EPC) or the partial European Search Report/Declaration of no search (R. 63 EPC) and the European Search Opinion issued in corresponding Foreign Application No. 16184186.1-1608 (9 pgs.).

*Primary Examiner* — Marina A Tietjen
*Assistant Examiner* — Frederick D Soski
(74) *Attorney, Agent, or Firm* — Alan D. Kamrath; Kamrath IP Lawfirm, P.A.

(57) ABSTRACT

A faucet having a faucet base, a water hose, a faucet head, and a chamber is provided. A water valve is provided in the chamber and includes a driving member and a control valve movable between a first position enabling mixing of water and air and a second position enabling shut-off of a water flow. The faucet head further includes a control member rotatably coupled with the faucet head to enable a user to operate the control valve within the water valve by operating the control member from a side of the faucet head.

12 Claims, 13 Drawing Sheets

(51) Int. Cl.
*F16K 21/06* (2006.01)
*F16K 31/44* (2006.01)

(52) U.S. Cl.
CPC ............ *E03C 1/0412* (2013.01); *F16K 21/06* (2013.01); *F16K 31/44* (2013.01); *E03C 1/0401* (2013.01); *E03C 2001/0415* (2013.01); *Y02A 20/202* (2018.01); *Y02A 20/411* (2018.01)

(58) Field of Classification Search
CPC . E03C 1/04; F16K 21/06; F16K 31/44; Y02A 20/202; Y02A 20/411
See application file for complete search history.

(56) References Cited

U.S. PATENT DOCUMENTS

| | | | | |
|---|---|---|---|---|
| 8,424,781 | B2 * | 4/2013 | Rosko | B05B 1/1609 239/446 |
| 8,757,518 | B2 * | 6/2014 | Kao | E03C 1/0412 137/801 |
| 9,708,800 | B2 * | 7/2017 | Bosio | E03C 1/0404 |
| 2004/0112985 | A1 * | 6/2004 | Malek | B05B 1/1618 239/445 |
| 2006/0219822 | A1 * | 10/2006 | Miller | B05B 1/30 239/562 |
| 2007/0069169 | A1 | 3/2007 | Lin | |
| 2008/0276367 | A1 * | 11/2008 | Bares | E03C 1/04 4/677 |
| 2011/0049273 | A1 * | 3/2011 | Huang | B05B 1/1618 239/588 |
| 2015/0096116 | A1 * | 4/2015 | Doss | E03C 1/023 4/570 |
| 2016/0222635 | A1 | 8/2016 | Yuan et al. | |
| 2017/0058496 | A1 | 3/2017 | Chiu et al. | |
| 2017/0059050 | A1 | 3/2017 | Chiu et al. | |
| 2017/0059051 | A1 | 3/2017 | Chiu et al. | |

FOREIGN PATENT DOCUMENTS

| | | |
|---|---|---|
| CN | 205745594 U | 11/2016 |
| CN | 206054896 U | 3/2017 |
| CN | 104879556 B | 6/2017 |
| CN | 206320347 U | 7/2017 |
| CN | 206338480 U | 7/2017 |
| DE | 10 2016 115 796 A1 | 3/2017 |
| EP | 3 135 832 A1 | 8/2016 |
| TW | M432670 | 7/2012 |
| TW | 1567272 B | 1/2017 |
| WO | WO 2008/137034 A1 | 11/2008 |

* cited by examiner

FAUCETS PROVIDING ADDITIONAL CONTROL FOR WATER FLOW

CROSS-REFERENCE TO RELATED APPLICATION

This application is a Continuation-in-Part Application of application Ser. No. 15/189,087, which was filed Jun. 22, 2016.

TECHNICAL FIELD

The present invention relates to faucets providing additional control for water flow or water-and-air flow, including faucets having a faucet head with a control member to control a water valve.

BACKGROUND

Control valves for faucets have various components, many of which are discrete parts that are assembled to ensure good water-tight seal and long-term durability or reliability. The manufacturing of faucets, however, can become complicated and expensive as features, controls, and/or functions of faucets are revised over time.

For certain water faucet applications, one-touch valves were developed so a tap on an actuation element can control the water flow. An example of one-touch valves is those supplied by the 3M Company for mounting externally to a faucet. A one-touch valve may simplify the operation of a faucet. However, these one-touch valves are add-on components for placements at where water is discharged, i.e., directly at the outlet of a faucet. This also means that the valves are operated directly at the outlet where water flows through.

But adding a one-touch valve changes the overall design, dimension, and aesthetic appearance of a faucet, limiting the flexibility and/or attractiveness of the design or application. A post-sale-modification may raise reliability, durability, or repair issues. Further, operating a faucet outlet with hands, arms, or other parts of one's body, which may have grease, bacteria, or other contaminants may add grease, bacteria, or other contaminants to the faucet outlet itself, leading to hygiene or other concerns.

Conventional faucets contain handles to control water flow. When the faucet is operated in circumstances that require frequent on/off operations, having handles that are away from the location where water is discharged may cause inconvenience. Although placing a handle near the location where water is discharged may be a solution, it may limit design options. For example, if a faucet has a removable head that travels with a connecting hose, the location of the control may affect the faucet hose or faucet design or limit its portability. As another example, closing the distance between the location where water is discharged and the control handle may limit design aesthetics.

SUMMARY

According to a disclosed embodiment, there is provided a faucet. The faucet can include a faucet base, a water hose, a faucet head, a chamber, a water valve, and a control member.

The faucet base can have a first and second end. The faucet base can be adapted to be mounted to support the faucet near the first end and to regulate water flow through the faucet.

The water hose can be coupled with the faucet base by extending through the first end and second end of the faucet base. The water hose can be adapted to be flexible and can be movable through an opening in the first end and through an opening in the second end.

The faucet head can be movably coupled to the second end of the faucet base. The faucet head can be adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base.

The chamber can be provided within the faucet head and can have a first end and a second end. The first end of the chamber can be coupled with the water hose and can be coupled, in a dismountable manner, to the second end of the faucet base. The second end of the chamber can provide an outlet to discharge the mixture of water-and-air flow.

The water valve can be provided within the chamber and can be located between the first end and the second end of the chamber. The water valve can include at least one air inlet and a water inlet to enable mixing air from the at least one air inlet with water from the water inlet. The water inlet can be coupled with the water hose. The air inlet can be coupled with the chamber.

The water valve can further include a control valve movable within the water valve between a first position and a second position. The first position can enable mixing air from the air inlet with water from the water inlet to provide the mixture of water-and-air flow. The second position can enable shut-off of the mixture of water-and-air flow. A direction of the control valve's movement between the first position and the second position can be substantially parallel to a direction of a water flow from the first end of the chamber to the second end of the chamber. The control valve can use a water pressure supplied by the water hose to facilitate an operation of the control valve.

The control member can be rotatably coupled with the faucet head. The control member can be adapted to enable an operation of the control valve within the water valve by rotating the control member from a side of the faucet head in at least one of a clockwise direction and a counterclockwise direction. The rotation of the control member can cause the control valve to move between the first position and the second position.

According to another disclosed embodiment, there is provide a faucet. The faucet can include a faucet base, a water hose, a faucet head, a water valve, and a control member.

The faucet base can have a first and second end.

The water hose can extend within the faucet base and can be movable through the second end of the faucet base.

The faucet head can have a first end, a second end, a chamber between the first and second end of the faucet head and coupled with the water hose, and an outlet coupled with the chamber at or near the second end of the faucet head to discharge a mixture of water-and-air flow. The first end of the faucet head can be adapted to be coupled to the second end of the faucet base while remaining coupled to the water hose and to be dismountable from the second end of the faucet base while remaining coupled to the water hose.

The water valve can be provided within the chamber. The water valve can include one or more air inlets and a water inlet to enable mixing air from the one or more air inlets with water from the water inlet. The water inlet can be coupled with the water hose. The one or more air inlets can be coupled with the chamber.

The water valve can further include a control valve movable within the water valve between a first position and a second position. The first position can enable mixing air from the air inlet with water from the water inlet to provide the mixture of water-and-air flow. The second position can enable shut-off of the mixture of water-and-air flow. The control valve can be adapted to move between the first position and the second position in a direction substantially parallel to a direction of a water flow from the first end of the faucet head to the second end of the faucet head. The control valve can use a water pressure supplied by the water hose to facilitate an operation of the control valve.

The control member can be rotatably coupled with the faucet head at a side of the faucet head. The control member can be adapted for user operation by rotation to in at least one of a clockwise direction and a counterclockwise direction to cause the control valve to move between the first position and the second position.

According to yet another disclosed embodiment, there is provided a faucet. The faucet can include a faucet base, a water hose, a faucet head, a chamber, a water valve, and a control member.

The faucet base can have a first end, second end, and a water flow control coupled near the first end for regulating a water flow through the faucet. The first end of the faucet base can be adapted to be mounted to support the faucet.

The water hose can be accommodated between the first end and second end of the faucet base and can be movable through an opening near the first end and an opening near the second end of the faucet base.

The faucet head can be coupled to the water hose and, in a dismountable manner, to the second end of the faucet base while remaining coupled to the water hose.

The chamber can be provided within the faucet head. The chamber can have a first and second end. The first end of the chamber can be coupled with the water hose and can be coupled, in a dismountable manner, to the second end of the faucet base. The chamber can be adapted to discharge a mixture of water-and-air flow near the second end of the chamber.

The water valve can be provided within the chamber and can be located between the first and second end of the chamber. The water valve can include an air inlet and a water inlet to enable mixing air from the air inlet with water from the water inlet to provide the mixture of water-and-air flow. The water inlet can be coupled with the water hose. The air inlet can be coupled with the chamber.

The water valve can further include a control valve movable within the water valve between a first position and a second position in a direction approximately parallel with a direction of a water flow from the first end of the chamber to the second end of the chamber. The first position can enable mixing air from the air inlet with water from the water inlet to provide the mixture of water-and-air flow. The second position can enable shut-off of the mixture of water-and-air flow. An operation of the control valve can be facilitated by a water pressure supplied by the water hose.

The control member can be rotatably coupled with the faucet head. The control member can include a knob being adapted for user operation in at least one of a clockwise direction and a counterclockwise direction with respect to a center axis of the knob approximately perpendicular to a side surface of the faucet head. The control member can further include a cam coupled to the knob. The cam can be adapted to engage with the control valve in a way to move the control valve from the second position to the first position when the knob is rotated.

DETAILED DESCRIPTION

Figure 1:
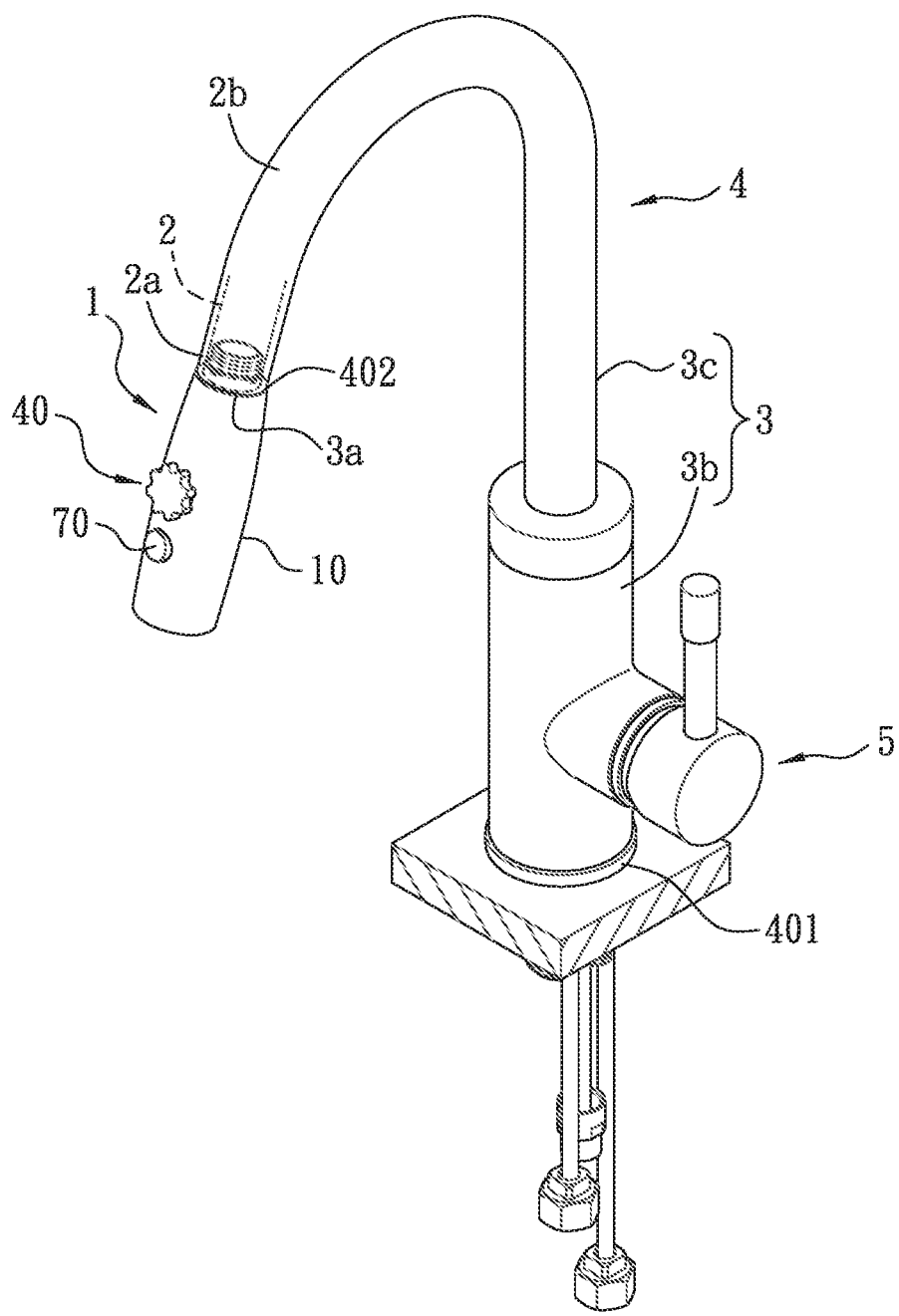
FIG. 1 is a perspective view illustrating an embodiment of a faucet consistent with the present invention.

Referring to FIG. 1, one embodiment of the present invention provides a faucet including a faucet base 4, a water hose 2, and a faucet head 1. Faucet base 4 can include a first end 401 and a second end 402. Water hose 2 can be coupled to faucet base 4 by extending through first end 401 and second end 402 of faucet base 4. Water hose 2 can be adapted to be flexible and movable through an opening of first end 401 and through an opening of second end 402 of faucet base 4. Faucet head 1 can be movably coupled to second end 402 of faucet base 4. Faucet head 1 can be adapted to be dismountable, and can be pulled away, for example, from faucet base 4 while remaining coupled to water hose 2 to direct water to a location away from faucet base 4. Faucet head 1 can be adapted to be relocated back to faucet base 4.

Faucet base 4 can be mounted to support the faucet near first end 401 and to regulate water flow through the faucet. Faucet base 4 can include a water flow control 5 coupled with water hose 2 and located near first end 401 of faucet base 4 to control an amount of water flowing through water hose 2 and to vary a mix of cold water and hot water going into water hose 2. For example, water flow control 5 can be mounted near a lower portion of faucet base 4 near a side opening of faucet base 4. Water flow control 5 can be coupled with water hose 2, a cold water intake, and a hot water intake to vary, when a water flow is enabled, a mix of cold water and hot water going into water hose 2.

Figure 2:
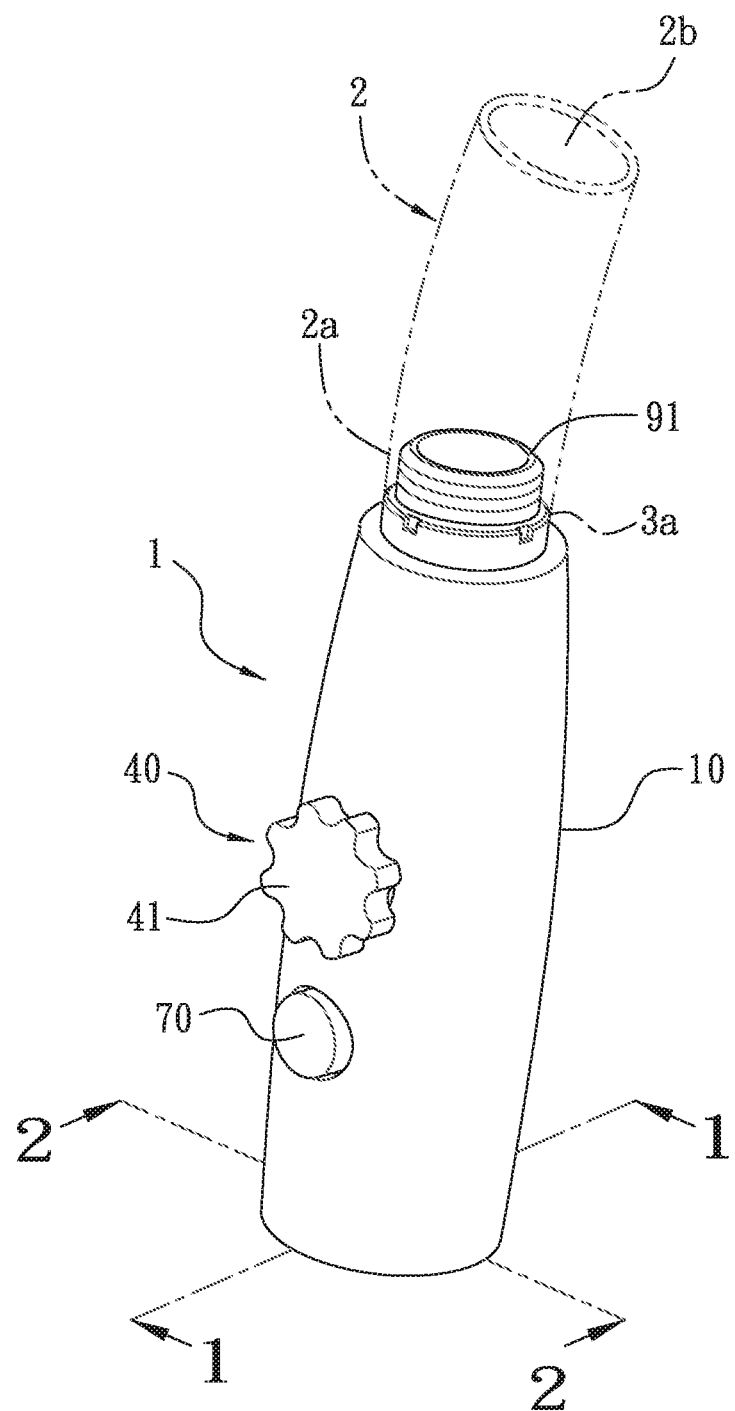
FIG. 2 is a perspective view illustrating an embodiment of a faucet head consistent with the present invention, with dotted line illustrating a water hose.

Referring to FIGS. 1 and 2, a faucet head 1 can be mounted on a pull-out faucet base 4 or a pull-down faucet base 4, which can include a body portion 3 and, for example, can be mounted in a kitchen or a bathroom, such as over or near a sink. Faucet head 1 can be coupled with a water supply segment 2a of water hose 2, and water hose 2 can be movably accommodated within and slidable through faucet base 4. Water hose 2 can include a water conduit 2b defined therein. Faucet head 1 and water hose 2 can be pulled out and retracted back to an outlet 3a at second end 402 of faucet base 4. Body portion 3 of faucet base 4 can include a base holder 3b and a tubular extension 3c extending from holder 3b and, in some embodiments, bend forward and downward as illustrated in FIG. 1. The amount of the bend, illustrated like a swan neck in FIG. 1, may depend on aesthetic designs, faucet applications, cost/manufacturing considerations, and/or other factors. Water hose 2 can extend through holder 3b and tubular extension 3c.

Figure 3:
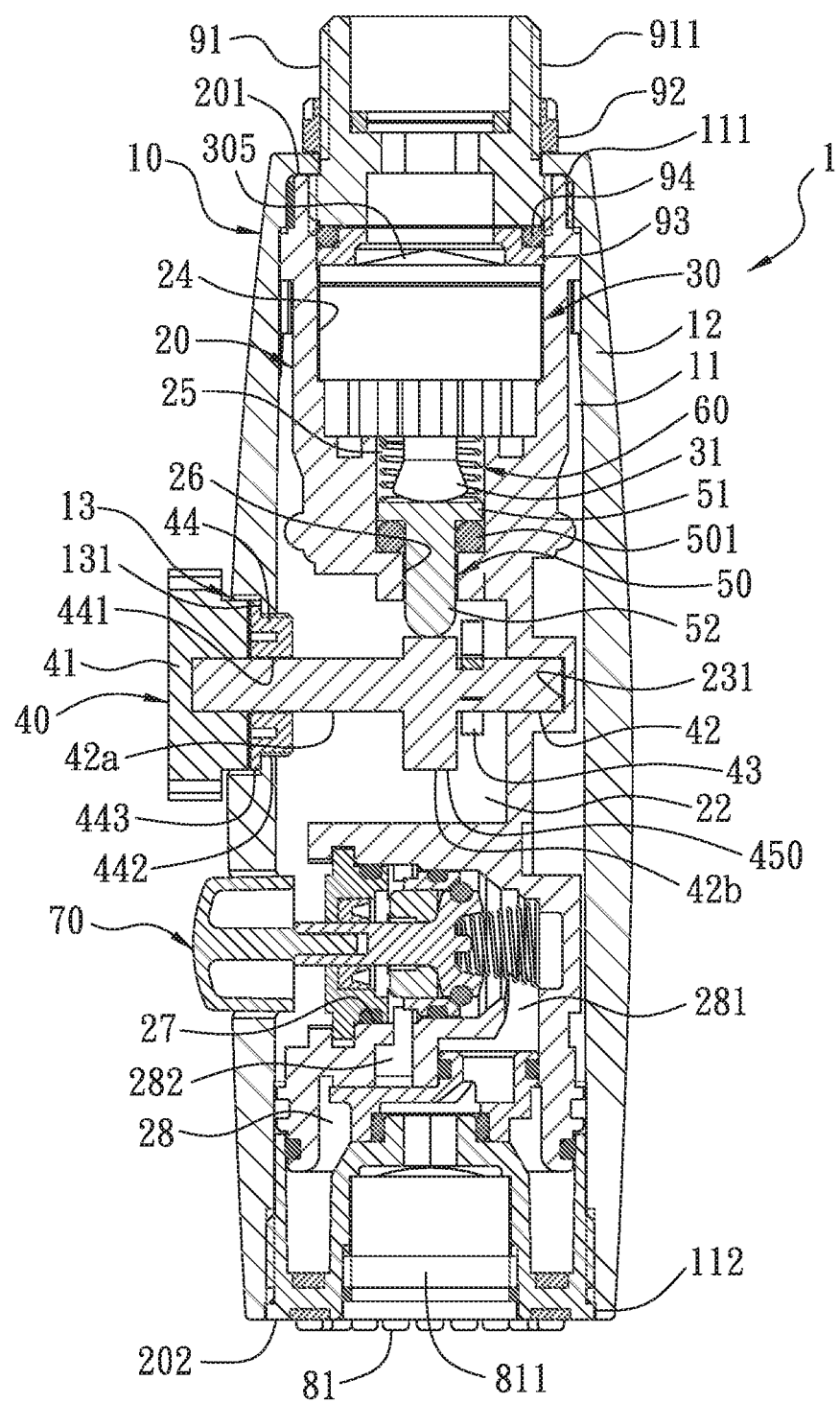
FIG. 3 is a cross-sectional view of an embodiment of a faucet head, taken along line 1-1 of FIG. 2.
Figure 4:
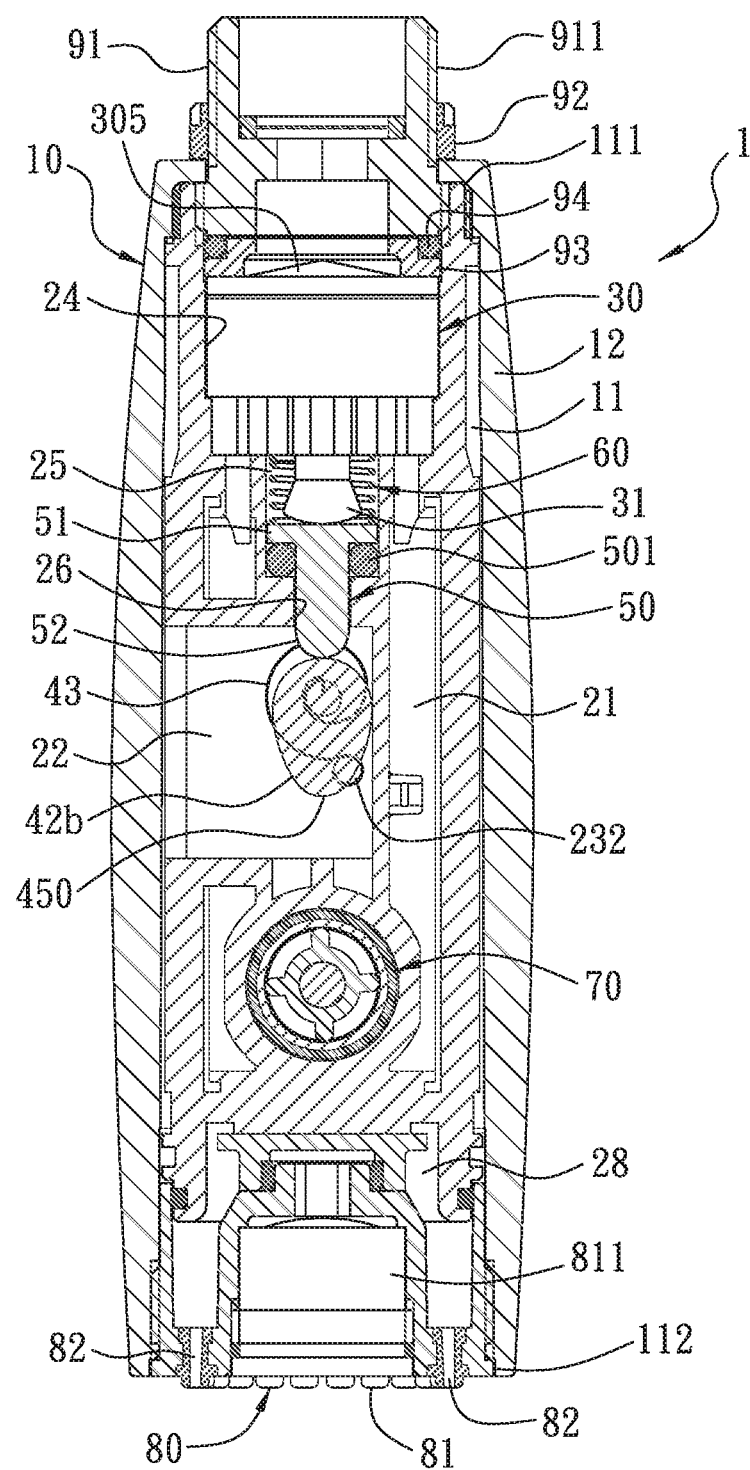
FIG. 4 is a cross-sectional view of an embodiment of a faucet head, taken along line 2-2 of FIG. 2.
Figure 5:
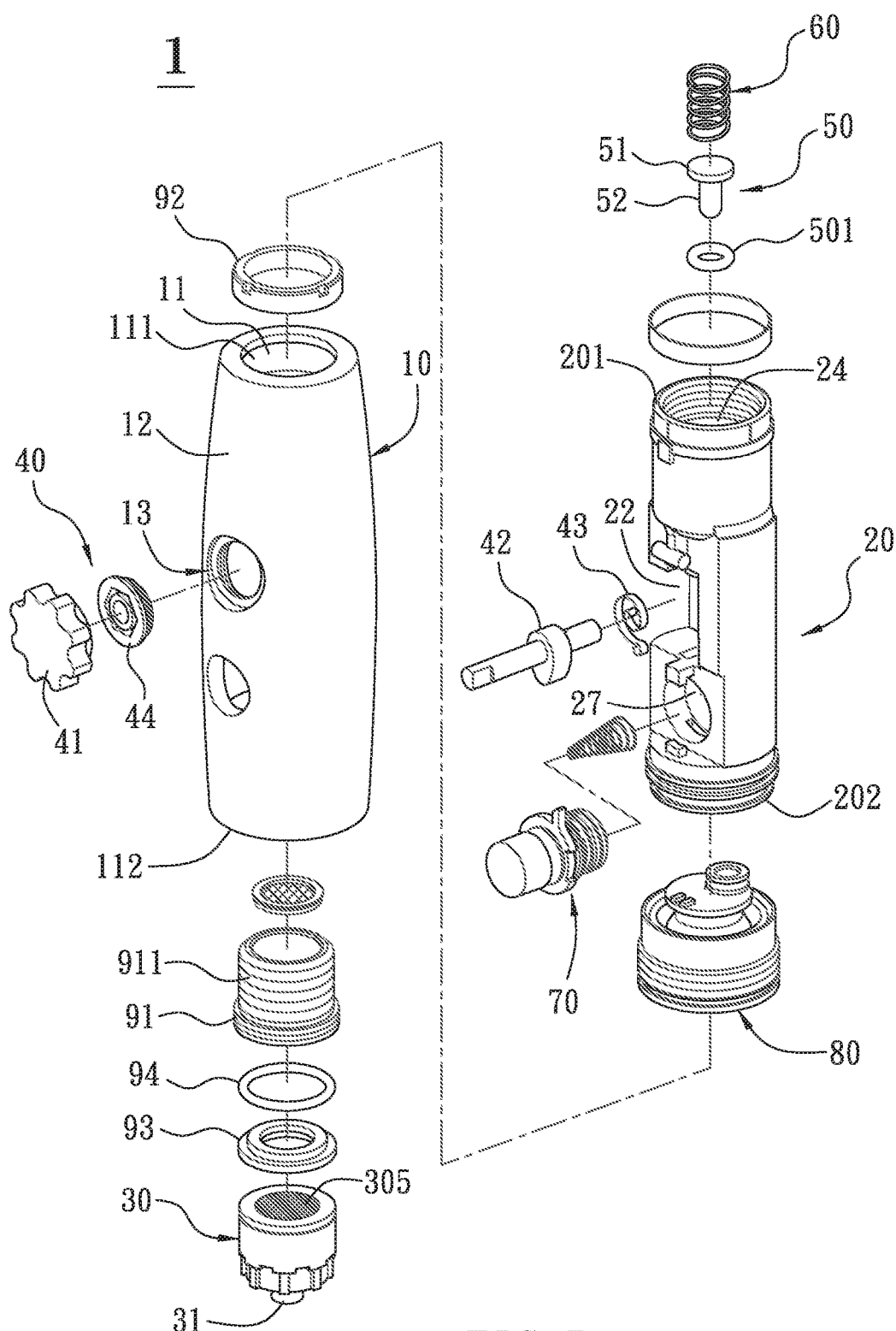
FIG. 5 is an exploded-view diagram illustrating an embodiment of a faucet head consistent with the present invention.

Referring to FIGS. 3-5, faucet head 1 can include an outer casing 10, a chamber 11, a water valve 30, and a control member 40. In some embodiments, chamber 11 may be an opening provided within faucet head 1 (or within outer casing 10), and faucet head 1 may provide chamber 11 therein, such as through a uni-body construction or a multiple-part construction. With a uni-body or integrated construction, a substantially-cylindrical space (cylinder) 20 within outer casing 10 may serve as a portion of chamber 11. Outer casing 10 can be manually operated by user, such as for holding and/or pulling faucet head 1, and can include chamber 11. Chamber 11 can be configured to be within faucet head 1 and include a first end 111 and a second end 112. First end 111 of chamber 11 can provide a water inlet coupled with water hose 2, and second end 112 of chamber 11 can provide a water and air outlet to discharge a mixture of water-and-air flow near second end 112 of chamber 11. First end 111 of chamber 11 can be coupled, in a dismountable manner, to second end 402 of faucet base 4.

For example, faucet head 1 can be dismountable from second end 402 of faucet base 4 while remaining coupled to water hose 2 to direct a mixture of water-and-air flow to a location away from faucet base 4 and to be relocated back to second end 402 of faucet base 4 to discharge the mixture of water-and-air flow while being coupled to faucet base 4.

Figure 7:
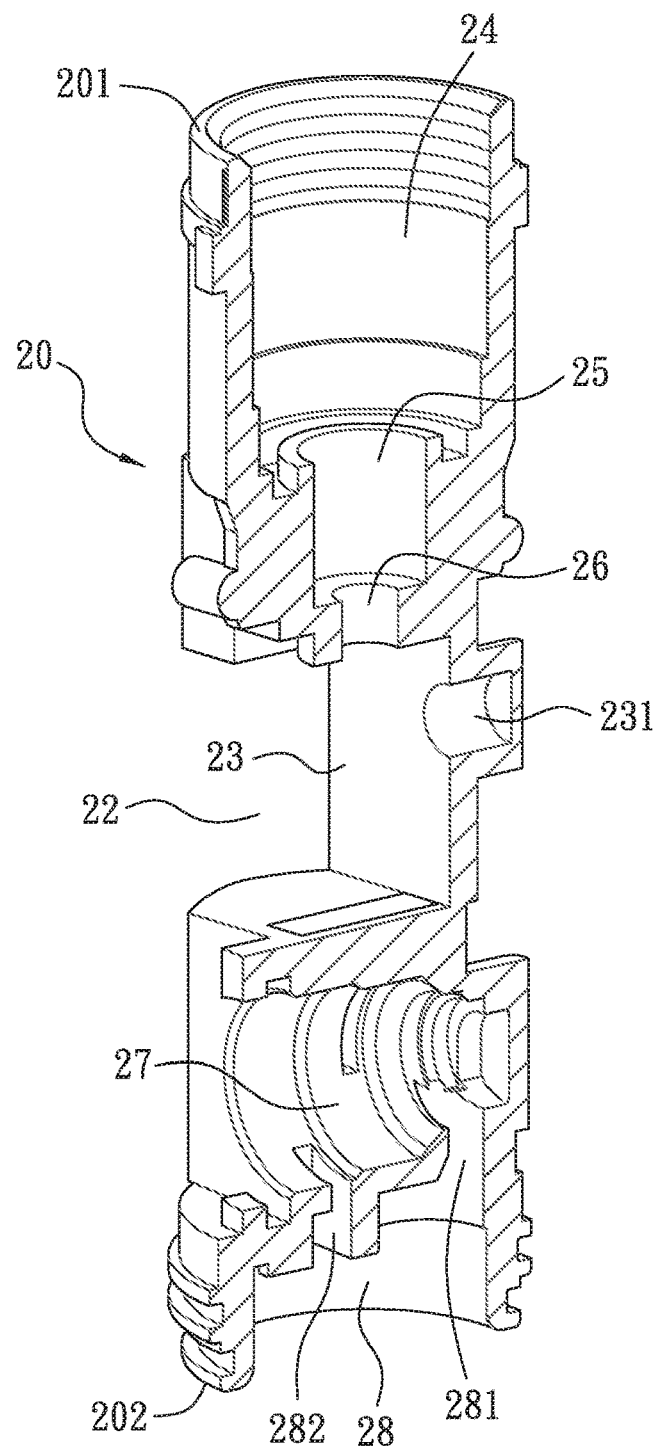
FIG. 7 is a perspective-section diagram illustrating an embodiment of a portion of a chamber in a faucet head consistent with the present invention.
Figure 8:
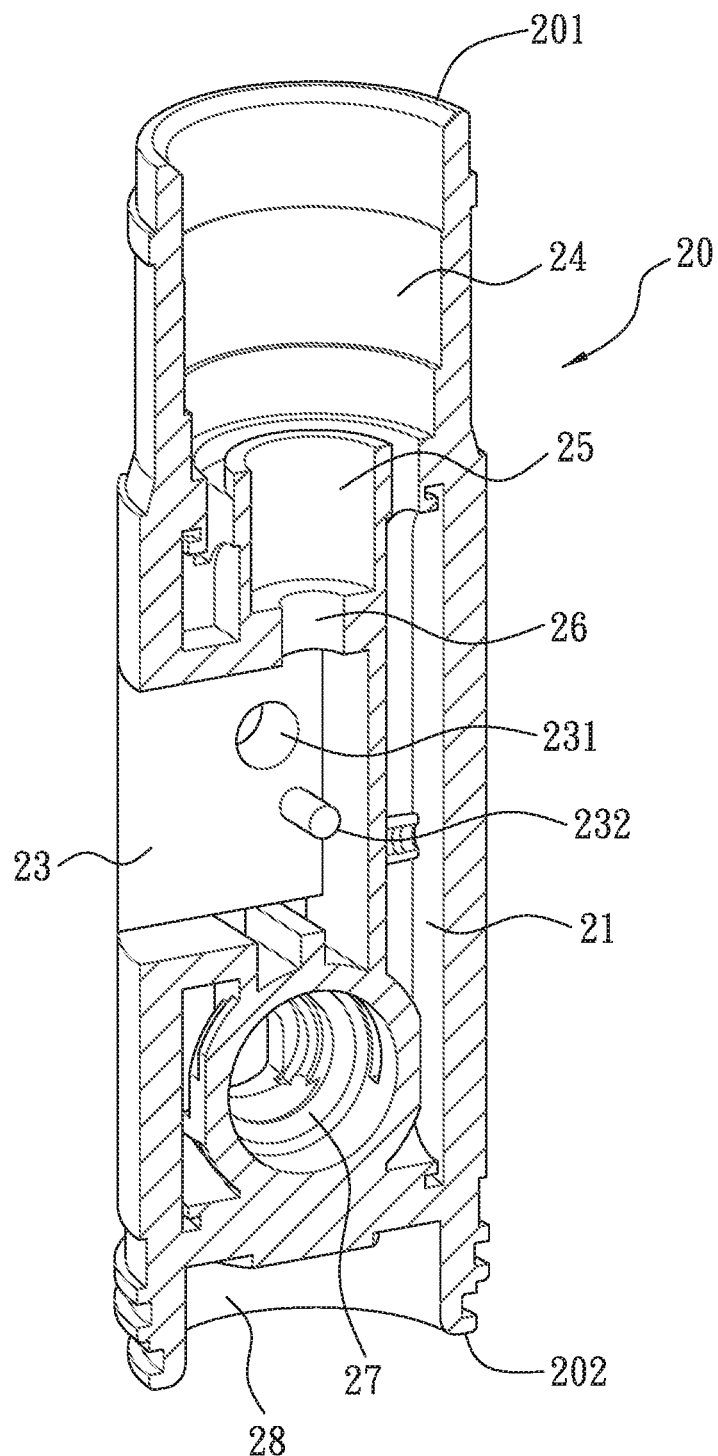
FIG. 8 is another perspective-section diagram illustrating an embodiment of a portion of a chamber in a faucet head consistent with the present invention.

Referring to FIGS. 3-5, 7, and 8, cylinder 20 can be housed in chamber 11 of outer casing 10 and can include an inlet segment 201 communicating with water conduit 2b of water hose 2 via an inflow connector 91 (see FIGS. 1 and 2), an outlet segment 202, at least one first orifice 21, and a second orifice 22. As shown in FIGS. 7 and 8, first orifice 21 and second orifice 22 can be defined between inlet segment 201 and outlet segment 202.

Figure 13:
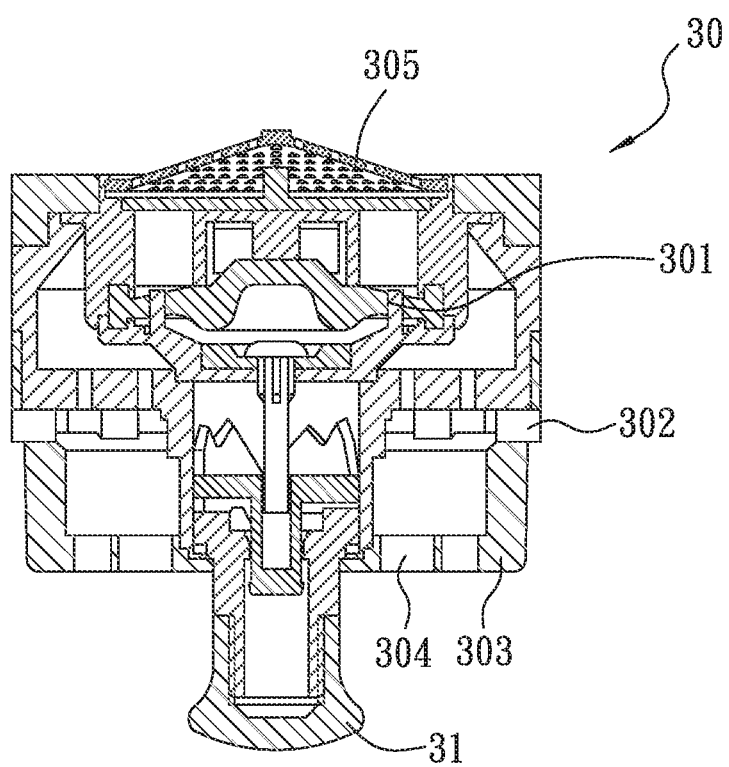
FIG. 13 is a cross-sectional view illustrating an embodiment of a water valve consistent with the present invention.

Water valve 30 can be positioned within chamber 11 and located between first end 111 and second end 112 of chamber 11. Water valve 30 can be accommodated in cylinder 20. Referring to FIG. 13, water valve 30 can include one or more air inlets 302 and a water inlet 305 to enable mixing air from air inlets 302 with water from water inlet 305. Air inlets 302 of water valve 30 can be coupled with chamber 11. Water inlet 305 can be coupled with water hose 2. Chamber 11 can include at least one air inlet at or near a side of faucet head 1 or second end 112 of chamber 11. The at least one air inlet of chamber 11 can be in communication with air inlets 302 of water valve 30 to enable the water valve's mixing of water and air. For example, an opening on faucet head 1 (or outer case 10) in communication with chamber 11 can serve as the air inlet of chamber 11 to supply air to water valve 30. An opening 13 of outer casing 10, as shown in FIG. 5 and will be described further below, can be adapted to communicate with and allow air intake to air inlets 302 of water valve 30. A side opening of faucet head 1 for accommodating a switch valve 70, as shown in FIG. 3 and will be described further below, can also be adapted to communicate with and allow air intake to air inlets 302 of water valve 30.

Alternatively or additionally, a center outlet 81 and/or a plurality of peripheral outlets 82, as shown in FIG. 3, can serve as an air inlet of chamber 11 to supply air to water valve 30. As will be described further below, center outlet 81 and peripheral outlets 82 can be adapted to communicate with chamber 11 to discharge a flow of the water-and-air mixture in a stream discharge mode and a spray discharge mode, respectively. When in the stream discharge mode, one or more peripheral outlets 82 can be adapted to communicate with and allow air intake to air inlets 302 of water valve 30. When in the spray discharge mode, center outlet 81 can be adapted to communicate with and allow air intake to air inlets 302 of water valve 30.

Water valve 30 can include a control valve 301 movable within water valve 30 between a first position and a second position. The first position can be a position that enables mixing air from air inlets 302 with water from water inlet 305 to provide a mixture of water-and-air flow. The second position can be a position that enables shut-off of a mixture of water-and-air flow. A direction of the movement of control valve 301 between the first position and the second position can be substantially parallel to a direction of a water flow (or a water-and-air flow) from first end 111 to second end 112 of chamber 11. Control valve 301 can be adapted to use a water pressure supplied by water hose 2 to facilitate an operation of control valve 301, either in one direction or in both directions.

Water valve 30 can be a water-pressure-assisted aerator with a control valve. In one embodiment and referring to FIG. 13, water valve 30 can contain a screen 303 coupled with control valve 301 and located downstream of control valve 301. Screen 303 can include a plurality of water passageways 304, with as little as two or four passageways to as many as a dozen or dozens of passageways. Water passageways 304 can be in communication with one or more air inlets 302 of water valve 30 to enable the water valve's mixing of water and air into a mixture of water-and-air flow. Air inlets 302 may have openings from the side, from the above, from the lower portion of water valve 30, or having the openings in any of the combinations. The air inlets may enable the faucet head and the chamber to be designed with flexibilities and with openings or gaps to enable air flow.

Referring to FIGS. 3-5 and 13, control valve 301 can include a driving member 31 that protrudes out from one end of water valve 30, such as from a lower portion or the bottom of water valve 30. Driving member 31 can be engaged with and driven by control member 40 to control a position of control valve 301. For example, driving member 31 can be driven to move control valve 301, such as moving it up, to turn on water valve 30 so that water flows into at least one first orifice 21 of cylinder 20 from water conduit 2b of water hose 2 and into water inlet 305 of water valve 30. When control valve 301 is pushed up, it breaks the water-tight seal between control valve 301 and a lateral or internal wall of water valve 30 to cause the water from the connected water hose 2, through water conduit 2b, to flow through water inlet 305. Water inlet 305 may be equipped with a screen, a mesh, or some other debris- or particle-blocking design to avoid any debris or particle from entering the water-tight seal of control valve 301, which may cause it to lead or malfunction. When control valve 301 is lowered, it returns to its water-tight seal state, and the control valve 301 may be designed with surface(s) onto which water pressure may exert additional force to reinforce the water-tight seal between control valve 301 and an internal wall of water valve 30. The seal between control valve 301 and water valve 30 may be formed with rubber, resin, or other suitable sealing materials.

In one embodiment, the control valve may be coupled or equipped with a spring and a cam that moves or locks control valve in two or more different positions each time the driving member 31 is pressed. The design or operation may be similar to or a variation of those used in retractable/clicking pens. U.S. Pat. No. 3,819,282 discloses one example of such design. In one embodiment of control valve 301, a second/resting position can provide a water-tight seal and stop water flow. A first position can open the seal between control valve 301 and internal wall(s) of water 30, and the opening enables the water flow. A third position or additional positions are optional, and when used, it/they may keep the seal open, but modulate the water flow by providing a bigger (or smaller) gap(s) to provide more (or less) water flow than the water flow at the first position.

Driving member 31 can include a pin, rod, stem, tube, or an elongated structure protruding out of water valve 30. Driving member 31 can include a head for coupling with push member 40 and a body connected to the head for transmitting force and/or motion.

With reference to FIGS. 3-5, faucet head 1 can include a pin 50 extending out of a cavity 25 from a through hole 26 to engage with control member 40 so that control member 40 can actuate driving member 31 via pin 50.

As illustrated in FIGS. 3, 4, 9 to 12, control member 40 can be rotatably coupled with faucet head 1 at or near a side of faucet head 1 (or outer casing 10) to enable an operation of control valve 301 within water valve 30. The operation may occur by rotating control member 40 from or near a side of faucet head 1 in at least one of a clockwise direction and a counterclockwise direction to cause control valve 301 to move between the first position and the second position.

Control member 40 can include a knob 41 and a camshaft 42 coupled to knob 41. Camshaft 42 can include a shaft 42a and a cam 42b. Cam 42b can be coupled with knob 41 through shaft 42a. Shaft 42a can include a non-circular connector 421 at one end for insertion into a corresponding non-circular hole 411 of knob 41. For example, non-circular connector 421 and non-circular hole 411 are D-shaped for connection. Camshaft 42 can be provided through a unibody construction or a multiple-part construction.

When control member 40 is rotated by rotating knob 41, rotation of knob 41 can cause cam 42b to rotate. Knob 41 can be adapted for user operation to rotate in at least one of a clockwise direction and a counterclockwise direction with respect to a center axis 500 of knob 41 substantially perpendicular to a side surface of faucet head 1.

Cam 42b can be adapted to engage with control valve 301 to move control valve 301 from the second position to the first position when knob 41 is rotated. Cam 42b can have a surface 450 for contacting and/or exerting a force, directly or indirectly, on driving member 31 such that a rotation of cam 42b can be transformed into a movement of driving member 31, which in turn causes a movement of control valve 301.

For example, knob 41 can be rotatably coupled with a side surface of faucet head 1, and rotation of knob 41, in at least one of a clockwise direction and a counterclockwise direction with respect to center axis 500 of knob 41 substantially perpendicular to the side surface of faucet head 1, can be converted to a movement of control valve 301 from the second position to the first position in a substantially upward direction.

Cam 42b can be adapted to cause control valve 301 to return from the first positon to the second position when knob 41 is further rotated in at least one of a clockwise direction and a counterclockwise direction with respect to center axis 500 of knob 41. For example, cam 42b can be further rotated in a clockwise direction or a counterclockwise direction to cause control valve 301 to return from the first position to the second position after cam 42b has been rotated in the same direction to cause control valve 301 to move to the first position. Alternatively, cam 42b can be further rotated in a clockwise direction or a counterclockwise direction to cause control valve 301 to return from the first position to the second position after cam 42b has been rotated in the opposite direction to cause control valve 301 to move to the first position. Alternatively, cam 42b can be adapted to rotate continually in one direction to turn on and shut off water valve 30 alternately.

Cam 42b can be adapted to rotate in the same direction as knob 41. Alternatively, cam 42b can be adapted to rotate in the opposite direction as knob 41.

Figure 11:
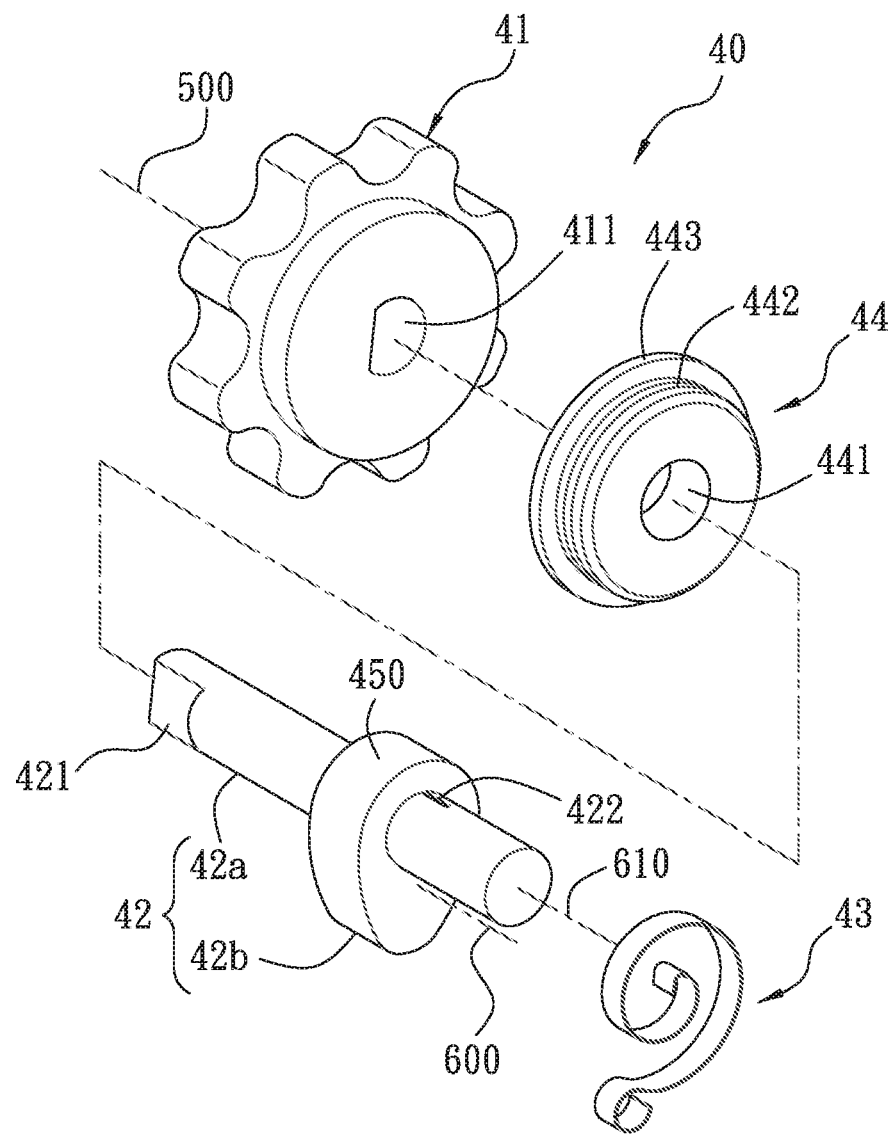
FIG. 11 is another exploded-view diagram illustrating an embodiment of a control member consistent with the present invention.
Figure 14:
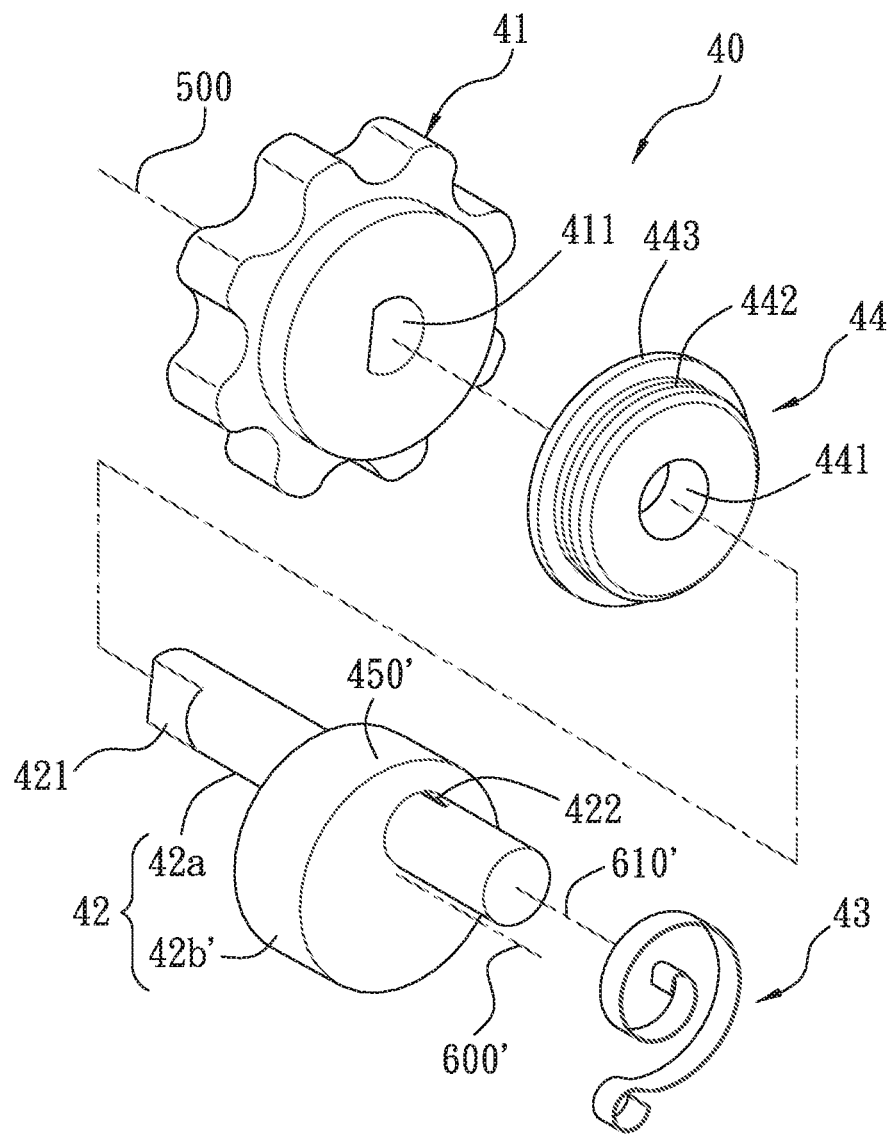
FIG. 14 is a yet another exploded-view diagram illustrating an embodiment of a control member consistent with the present invention.

Control member 40 can include a cam having a circular or non-circular shape with a center axis offset from its axis of rotation. For example, FIG. 11 illustrates that cam 42b has a non-circular shape with a center axis 600 offset from an axis of rotation 610. Alternatively, a circular cam such as one having a substantially round surface can be used. As shown in FIG. 14, a circular cam 42b' can be coupled with shaft 42a such that a center axis 600' of cam 42b' is offset from its axis of rotation 610'. Cam 42b' can have a substantially round surface 450' being adapted to engage with control valve 301 to cause the movement of control valve 301.

Knob 41 can have an axis of rotation coinciding with an axis of rotation of cam 42b (or cam 42b'). For example, center axis 500 of knob 41 can coincide with axis of rotation 610 of cam 42b, when center axis 500 is also the axis of rotation of knob 41. Alternatively, the center axis of knob 41 can be offset from the axis of rotation of cam 42b when knob 41 has a non-circular profile.

Knob 41 can include a grooved, lobed, armed, starred, or wavy edge or other designs such as a cap, a skirt, a wing, a pointer, or a selector to enhance operation of the knob. Other structures such as a dial, a collet, a T bar, a finger wheel, or other rotary devices capable of being operated can be used to replace or constitute, in part or in whole, the knob. Knob 41 can include a surface having a curved profile, a dimple, or some other surface shape, texture, or pattern so a user can identify it by touching or without looking.

As discussed above, control valve 301 can be configured to remain in the first position after control member 40 is rotated and released. For example, control member 40 can be released after being rotated to cause control valve 301 to move to and remain in the first position until control member 40 is operated again, such as by rotating, to cause control valve 301 to move from the first position to the second position.

Control member 40 can also include a spring to return control member 40 to an initial orientation when control member 40 is not being operated. The spring may be part of water valve 30 to provide the spring force to return control member 40 to its initial position after a user operate or releases it. The spring may also be a spring separated from a spring of water valve 30 and be placed between control member 40 and one part of chamber 11.

Faucet head 1 can include a spring 43 that is coupled with control member 40 to provide a force feedback to a user when knob 41 is rotated. Spring 43 can be configured to provide a force feedback through knob 41 by being attached to shaft 42a and cylinder 20. For example, spring 43 can have one end attached to a notch 422 of shaft 42a and the other end attached to a post 232 of cylinder 20. Notch 422 can be positioned near the end of shaft 42a connected with hole 231. Notch 422 can be positioned near cam 42b. Post 232 can protrude from an inner surface 23 of cylinder 20 into cavity 22.

Spring 43 can be adapted to provide a first level of force feedback when control valve 301 is at or near the first position and a second level of force feedback when control valve 301 is at or near the second position. The different levels of force feedback can provide a user with an improved feel of operating control member 40 and inform the user of an on-off status of water valve 30. For example, a higher level of force feedback can indicate that water valve 30 is turned on, and a lower level of force feedback can indicate that water valve 30 is shut off. The different levels of force feedback can be relative to each other and depending on design, and there may be more than two levels of force feedback. Spring 43 can provide a third level of force feedback informing a particular position of control valve 301 other than the first or second position of control valve 301.

Figure 12:
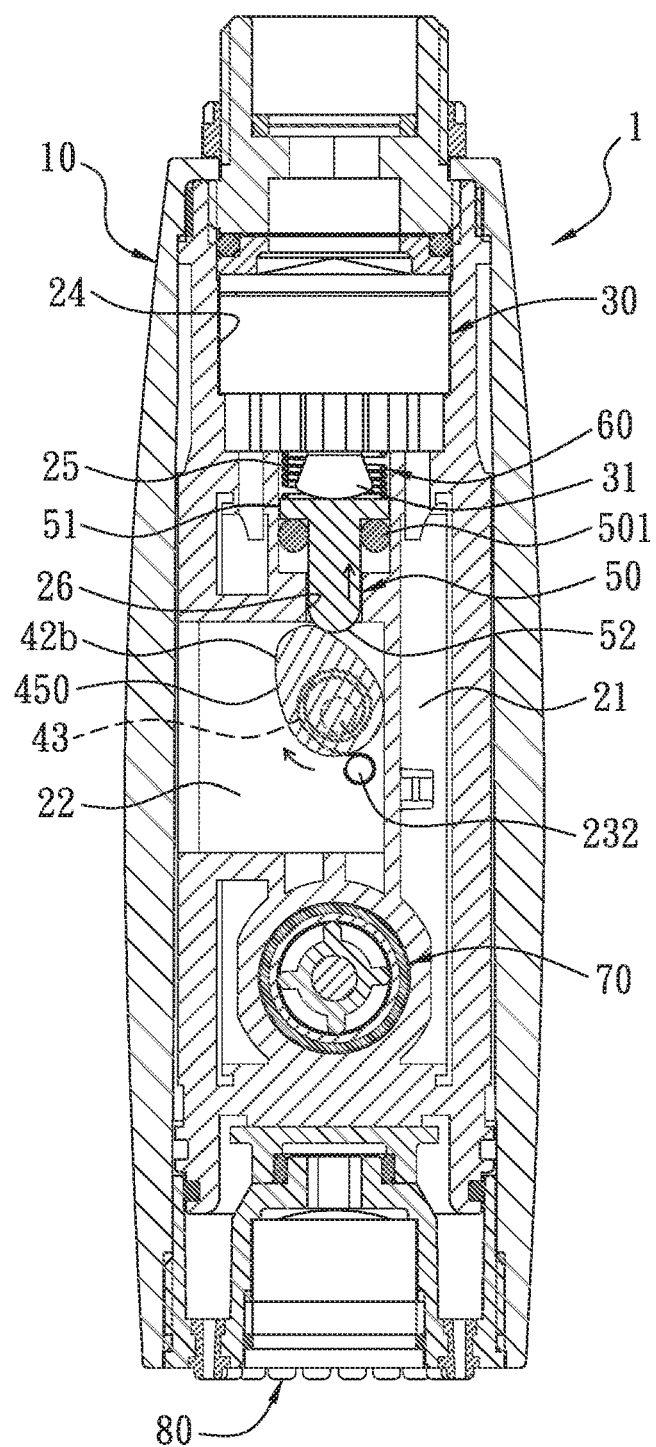
FIG. 12 is a cross-sectional view illustrating an embodiment of a faucet head consistent with the present invention.

For example, spring 43 can provide a first level of force feedback through knob 41 when cam 42b is rotated to cause control valve 301 to move into the first position. FIG. 12 shows that cam 42b is being rotated in a clockwise direction to cause control valve 301 to move into or approach the second position. A user may start to feel the first level of force feedback when control valve 301 approaches the second position. On the other hand, spring 43 can provide a second level of force feedback through knob 41 when cam 42b is rotated to cause control valve 301 to move into the second position. FIG. 4 shows that cam 42b is rotated to a position to cause control valve 301 to move into or approach the second position. A user may start to feel the second level of force feedback when control valve 301 approaches the second position. A user may experience a greater feedback at the first level of force feedback than at the second level of force feedback. Alternatively, spring 43 and/or control member 40 can be configured that the user experiences a greater feedback at the second level of force feedback than at the first level of force feedback.

Referring to FIGS. 3-8, chamber 11 can include, in cylinder 20, for example, a cavity 24 located in inlet segment 201, cavity 25 formed at a bottom of cavity 24, and through hole 26 in spatial communication with cavity 25. At least one first orifice 21 can communicate with cavity 24 and the outlet segment 202. Water valve 30 can be housed in cavity 24, and driving member 31 can be accommodated in cavity 25.

Figure 6:
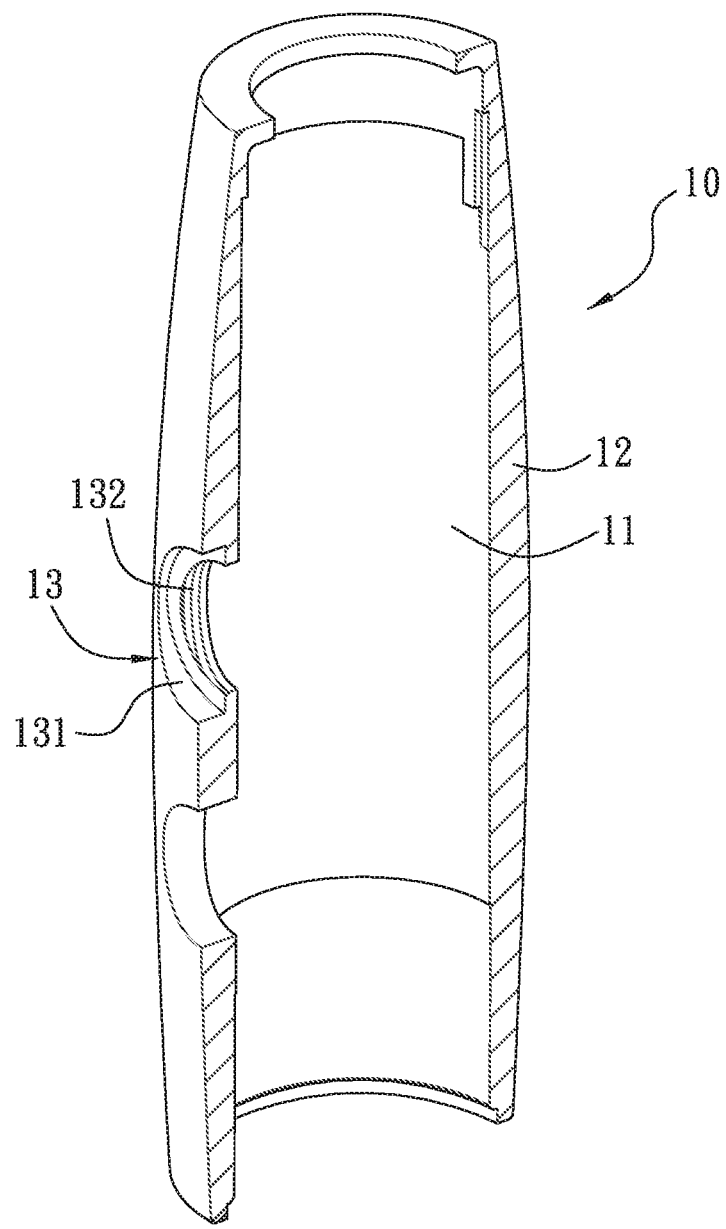
FIG. 6 is a perspective-section diagram illustrating an embodiment of a chamber in a faucet head consistent with the present invention.

Outer casing 10 can include a wall 12 configured to define chamber 11. Outer casing 10 can include an opening 13 defined in wall 12 corresponding to control member 40 so that control member 40 can be operated through opening 13, as shown in FIGS. 3, 5, and 6.

Figure 9:
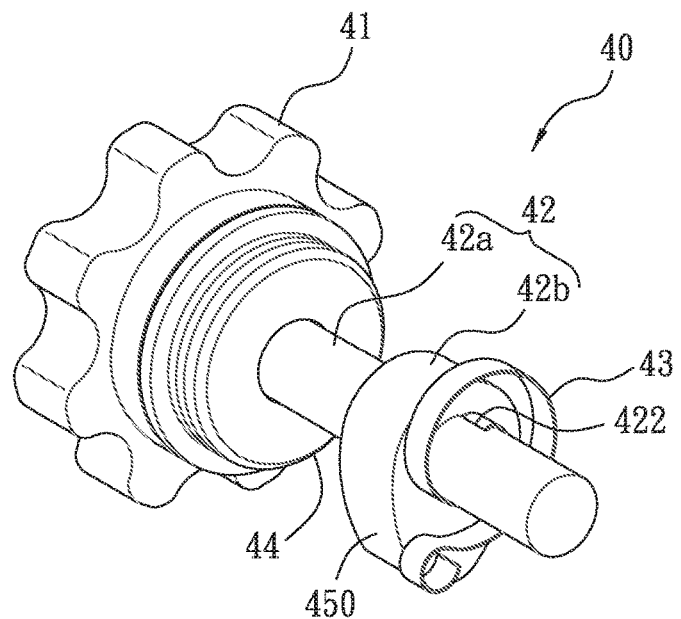
FIG. 9 is a perspective view illustrating an embodiment of a control member consistent with the present invention.
Figure 10:
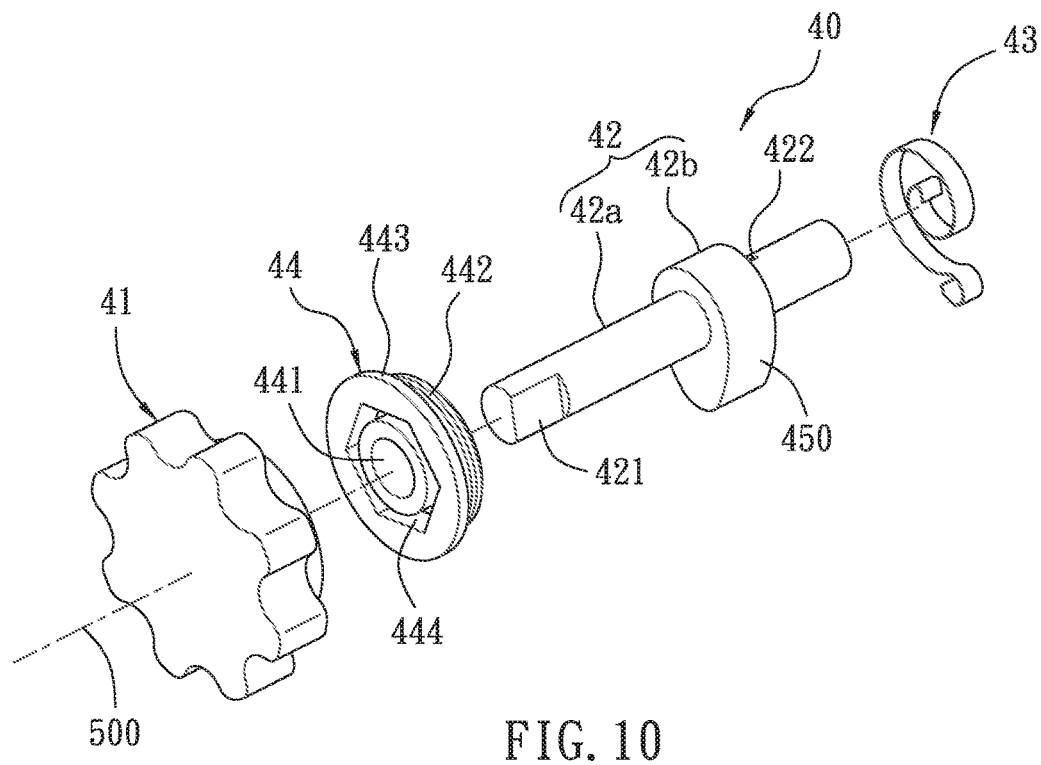
FIG. 10 is an exploded-view diagram illustrating an embodiment of a control member consistent with the present invention.

Referring to FIGS. 9-11, control member 40 can also include a seat 44 through which shaft 42a can be inserted. Seat 44 can include a through hole 441 for allowing shaft 42a to pass through and couple with knob 41. As will be described further below, seat 44 can include a thread 442 and a flange 443 extending outward from thread 442 for attaching control member 40 to faucet head 1 (or outer casing 10).

Referring to FIGS. 3 and 5-8, control member 40 can be at least partially inserted through opening 13 and positioned in cavity 22. Opening 13 can include a recess 131 in a surface of outer casing 10 and a threaded portion 132 for engaging with seat 44 of control member 40. Specifically, thread 442 of control member 40 can engage with threaded portion 132 such that control member 40 can be attached to outer casing 10. When thread 442 engages with threaded portion 132, flange 443 of seat 44 can abut against a bottom surface of recess 131. As shown in FIG. 10, seat 44 can include a non-circular slot 444 on the side of seat 44 facing outward (facing knob 41) for receiving a tool to screw seat 44 onto outer casing 10. For example, non-circular slot 444 can be a hexagonal slot for receiving a tool such as a hex key or screwdriver to engage thread 442 with threaded portion 132.

Second orifice 22 of cylinder 20 can be in spatial communication with a recess 231 and at least partially defined by inner surface 23 of cylinder 20. Second orifice 22 can be further in spatial communication with opening 13. When control member 40 is attached to outer casing 10 through seat 44, shaft 42a can be inserted into recess 231 such that the inserted end of shaft 42a can be adapted to rotate within recess 231. It is understood that other means of rotational connection can be used to replace the connection between shaft 42a and recess 231 as discussed above. For example, a protrusion can be provided to extend from inner surface 23 into a recess formed in one end of shaft 42a such that shaft 42a can be rotated relative to the protrusion.

Referring to FIGS. 3-5 and 12, pin 50 can include a head 51 for sliding upward and downward in cavity 25 and a body 52 extending from head 51 and extending out of through hole 26 from head 51. Head 51 can be configured to contact with and drive driving member 31 of water valve 30. A distal end of body 52 can be in contact with and driven by cam 42b of control member 40. Surface 450 can be caused to contact/push (or exert a force on) driving member 31 or pin 50 to cause driving member 31 to move control valve 301 to the first or second position. For example, surface 450 can be adapted to contact the distal end of body 52 to transform rotational motion of cam 42b into a linear motion of pin 50.

Referring to FIGS. 3-5 and 10, faucet head 1 can further include a compression spring 60 in cavity 25. Compression spring 60 can be accommodated between water valve 30 and head 51 of pin 50 to push pin 50 and control member 40 back to their previous positions after control member 40 is released.

An on-off indicator can be formed on knob 41 to indicate to which direction or what status control member 40 is rotated. The indicator can include colors, symbols, illumination, or other means. Moreover, the indicator can be adapted on outer casing 10.

Body 52 of pin 50 has can include a first seal washer 501 fitted thereon and sealing cavity 25 so as to prevent water leakage via through hole 26 from cavity 25, as illustrated in FIGS. 3 and 4.

Chamber 11 can provide a housing near second end 112 of chamber 11 to enclose a switch valve 70 guiding a flow of the water-and-air mixture between a stream discharge and a spray discharge. Switch valve 70 can be operated via a switch movably mounted on a side opening of faucet head 1.

For example, faucet head 1 can include switch valve 70 near second end 112 of chamber 11 to switch a flow of the water-and-air mixture between a stream discharge and a spray discharge. For example, switch valve 70 can be arranged on cylinder 20 and configured to switch a water flow between a stream discharge mode and a spray discharge mode. Faucet head 1 can include a water outlet 80, as shown in FIGS. 3 and 4. Switch valve 70 can be operated, such as by pressing, to cause the water to be guided through a center outlet 81 or a plurality of peripheral outlets 82 of water outlet 80 from the at least one first orifice 21 to produce at least two water discharge modes, such as a stream discharge mode and a spray discharge mode.

With reference to FIGS. 7 and 8, cylinder 20 can include a cavity 27 communicating with the at least one first orifice 21 to accommodate switch valve 70. Cylinder 20 can further include a recess 28 for accommodating water outlet 80. Recess 28 can include a central channel 281 and a peripheral channel 282 communicating with cavity 27.

Second end 112 of chamber 11 can provide a stream discharge of a water-and-air mixture through center outlet 81 of water outlet 80 and a spray discharge of a mixture of water and air through the plurality of peripheral outlets 82 of water outlet 80. Center outlet 81 can be in communication with and discharge water from central channel 281. The plurality of peripheral outlets 82 can be in communication with and discharge water from peripheral channel 282. Center outlet 81 can include a foam generator 811 to produce foamy water.

Cylinder 20 can be adapted to match with a water outlet so as to discharge water from the at least one first orifice 21 in a particular discharge mode.

Referring to FIGS. 3-5, faucet head 1 can further include an inflow connector 91 engaged at a top of cavity 24. Inflow connector 91 can include a threaded portion 911 extending from outer casing 10, a nut 92 engaging with threaded portion 911 of inflow connector 91 and locking inflow connector 91 and cylinder 20 to the top of outer casing 10, a padding 93 located between inflow connector 91 and a top of water valve 30 to limit water valve 30 in cavity 24, and a second seal washer 94 fitted on padding 93 and contacting with cavity 24.

When control valve 301 of water valve 30 is configured to operate automatically, driving member 31 can be driven to move control valve 301 to a position enabling water discharge. Thereafter, control valve 301 can move back to an original position to stop discharging water.

When control valve 301 is not configured to be automatic, control member 40 can be manually operated by the user to close control valve 301. Control member 40 can be operated to drive driving member 31 of water valve 30 to move control valve 301 to a position enabling shut-off of water.

Thus, water valve 30 can be driven by control member 40 so as to avoid touching and contaminating water valve 30. Control member 40 can be rotatably connected with cylinder 20 to simplify faucet head 1 and reduce fabrication cost.

Water valve 30 can be a pre-assembled assembly with a control valve, such as control valve 301, inside the water valve and with a driving member, such as driving member 31, protruding through one end of the water valve and coupled with the control valve to cause the control valve to move between a first and a second position, such as between the first and second position described above.

Faucet head 1 can be further adapted to discharge water in different discharge modes using means other than switch valve 70.

While the preferred embodiments of the invention have been set forth for the purpose of disclosure, modifications of the disclosed embodiments of the invention as well as other embodiments thereof may occur to skilled in the art. Accordingly, the appended claims are intended to cover all embodiments which do not depart from the spirit and scope of the invention.

What is claimed is:

1. A faucet comprising:
    a faucet base having a first and second end, the faucet base being mounted to support the faucet near the first end and to regulate water flow through the faucet;
    a water hose coupled with the faucet base by extending through the first end and second end of the faucet base, the water hose being flexible and movable through an opening in the first end and through an opening in the second end;
    a faucet head movably coupled to the second end of the faucet base, the faucet head being dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base;
    a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
    a water valve within the chamber and located between the first end and the second end of the chamber, the water valve comprising:
    at least one air inlet and a water inlet to enable mixing air from the at least one air inlet with water from the water inlet, the water inlet being coupled with the water hose, the air inlet being coupled with the chamber, and
    a control valve movable within the water valve between a first position and a second position, the first position enabling mixing air from the air inlet with water from the water inlet to provide the mixture of water-and-air flow, and the second position enabling shut-off of the mixture of water-and-air flow, a direction of the control valve's movement between the first position and the second position being parallel to a direction of a water flow from the first end of the chamber to the second end of the chamber, the control valve using a water pressure supplied by the water hose to facilitate an operation of the control valve; and
    a control member rotatably coupled with the faucet head, the control member being enable an operation of the control valve within the water valve by rotating the control member from a side of the faucet head in at least one of a clockwise direction and a counterclockwise direction, the rotation of the control member causing the control valve to move between the first position and the second position;
    a switch valve near the second end of the chamber to switch a flow of the water-and-air mixture between a stream discharge and a spray discharge.

2. The faucet of claim 1, wherein the control member comprises a knob and a cam coupled with the knob, the knob being used for user operation in the at least one of the clockwise direction and the counterclockwise direction with respect to a center axis of the knob perpendicular to a side surface of the faucet head, the cam being engaged with the control valve to move the control valve from the second position to the first position when the knob is rotated.

3. The faucet of claim 2, wherein the cam is engaged with the control valve to restore the control valve from the first position to the second position when the knob is rotated again in the at least one of the clockwise direction and the counterclockwise direction with respect to the center axis.

4. The faucet of claim 3, wherein at least one of the control member and the control valve is coupled to a spring that returns the control member to an initial position when the control member is not being operated.

5. The faucet of claim 1, wherein the chamber is an opening provided within the faucet head, and the faucet head provides the chamber therein through one of a uni-body construction or a multiple-part construction.

6. The faucet of claim 1, wherein the faucet head further comprises a spring that is coupled with the control member to provide a force feedback to a user when the knob is rotated and to provide a first level of force feedback when the control valve is at or near the first position and a second level of force feedback when the control valve is at or near the second position.

7. The faucet of claim 1, wherein the control member is operated to cause the control valve to move from the second position to the first position, and the control valve remains in the first position until the control member is further operated to cause the control valve to move from the first position to the second position.

8. The faucet of claim 1, wherein the chamber includes at least one air inlet at or near a side of the faucet head or the second end of the chamber, the at least one air inlet of the chamber is in communication with the at least one air inlet of the water valve to enable the water valve's mixing of water and air.

9. The faucet of claim 1, wherein the water valve contains a screen coupled with the control valve and located downstream of the control valve, the screen having a plurality of water passageways and being in communication with the at least one air inlet of the water valve to enable the water valve's mixing of water and air.

10. The faucet of claim 1, wherein the faucet base further comprises a water flow control coupled with the water hose, a cold water intake, and a hot water intake to vary, when a water flow is enabled, a mix of cold water and hot water going into the water hose.

11. The faucet of claim 1, wherein the chamber includes a cavity between the first end and the second end of the chamber for receiving the water valve, and the water valve is a pre-assembled assembly with the control valve inside the water valve and with a driving member protruding through one end of the water valve and coupled with the control valve to cause the control valve to move between the first and the second position.

12. The faucet of claim 1, wherein the faucet head comprises a water outlet near the second end of the chamber, the water outlet comprises a center outlet and a plurality of peripheral outlets, and the second end of the chamber provides a stream discharge of the mixture of water and air through the center outlet of the water outlet and a spray discharge of the mixture of water and air through the plurality of peripheral outlets of the water outlet.

* * * * *